US012675793B2

(12) United States Patent
Goulon et al.

(10) Patent No.: US 12,675,793 B2
(45) Date of Patent: Jul. 7, 2026

(54) DATA INPUT DEVICE COMPRISING MEANS FOR DETECTING A SPY DEVICE, AND CORRESPONDING DETECTION METHOD AND COMPUTER PROGRAM

(71) Applicant: BANKS AND ACQUIRERS INTERNATIONAL HOLDING, Suresnes (FR)

(72) Inventors: Maxime Goulon, Chatuzange-le-Goubet (FR); Gregory Michiel, Chabeuil (FR); Dominique Testu, Saint-Peray (FR)

(73) Assignee: BANKS AND ACQUIRERS INTERNATIONAL HOLDING, Suresnes (FR)

( * ) Notice: Subject to any disclaimer, the term of this patent is extended or adjusted under 35 U.S.C. 154(b) by 83 days.

(21) Appl. No.: 18/716,577

(22) PCT Filed: Nov. 23, 2022

(86) PCT No.: PCT/EP2022/082936
§ 371 (c)(1),
(2) Date: Jun. 5, 2024

(87) PCT Pub. No.: WO2023/104517
PCT Pub. Date: Jun. 15, 2023

(65) Prior Publication Data
US 2025/0053987 A1 Feb. 13, 2025

(30) Foreign Application Priority Data
Dec. 6, 2021 (FR) .................................. FR2112984

(51) Int. Cl.
*G06Q 20/40* (2012.01)
*G07F 7/10* (2006.01)

(52) U.S. Cl.
CPC ....... *G06Q 20/4016* (2013.01); *G07F 7/1033* (2013.01)

(58) Field of Classification Search
CPC ... G06Q 20/4016; G07F 7/1033; G07F 19/00; G07F 19/2055; G07G 1/00; G07G 3/003
See application file for complete search history.

(56) References Cited

U.S. PATENT DOCUMENTS

2006/0169764 A1 8/2006 Ross et al.
2009/0057395 A1 3/2009 He et al.
(Continued)

FOREIGN PATENT DOCUMENTS

CN 105097336 A 11/2015
GB 2351590 A 1/2001

OTHER PUBLICATIONS

O. Hussein, "A Proposed Approach to Secure Automated Teller Machine-Based Financial Transactions," 2021 Tenth International Conference on Intelligent Computing and Information Systems (ICICIS), Cairo, Egypt, 2021, pp. 236-242, doi: 10.1109/ICICIS52592. 2021.9694249. (Year: 2021).*

*Primary Examiner* — George Chen
*Assistant Examiner* — Tayar M Kyu
(74) *Attorney, Agent, or Firm* — Dilworth IP, LLC

(57) ABSTRACT

A data input device including a keypad. The data input device
  includes at least one proximity sensor positioned within a housing formed in an element of the device forming a projection in the vicinity of the keypad, the proximity sensor being oriented toward the keypad, the proximity sensor delivering measurements;
  and a program for analysing the measurements, delivering information representative of the presumed presence of
(Continued)

a spy device on the keypad when the measurements are higher than a predetermined threshold for a predetermined time period.

10 Claims, 3 Drawing Sheets

(56)                References Cited

U.S. PATENT DOCUMENTS

| 2010/0176191 | A1 * | 7/2010 | Ramachandran | ..... | G07F 19/207 |
| | | | | | 235/382 |
| 2013/0069784 | A1 | 3/2013 | Koike | | |
| 2014/0158768 | A1 * | 6/2014 | Ray | ........................ | H04K 3/825 |
| | | | | | 235/449 |
| 2015/0160717 | A1 * | 6/2015 | Chen | ........................ | G06F 21/88 |
| | | | | | 345/173 |
| 2022/0138755 | A1 * | 5/2022 | Aument | ................ | G07F 7/0873 |
| | | | | | 726/26 |

* cited by examiner

DATA INPUT DEVICE COMPRISING MEANS FOR DETECTING A SPY DEVICE, AND CORRESPONDING DETECTION METHOD AND COMPUTER PROGRAM

TECHNICAL FIELD

The invention relates to the field of self-service electronic devices, called unattended devices, and more particularly to the devices of this type which include a keypad to input data, and which can in this respect be referred to as data input devices.

PRIOR ART

Numerous self-service electronic devices, installed in public places, often outdoors, include a keypad allowing a user to input data. This is the case in particular of numerous automatic vending machines (e.g. fuel distribution pumps in a service station, transport ticket purchasing terminals, car park payment terminals, various dispensers, etc.), or automatic teller machines (ATM) for example. In a typical case, this keypad is for example used to input a confidential code associated with a payment card previously inserted in the electronic device, on an electronic payment terminal integrated in the device, to finalise a payment transaction relating to the purchase of a good or a service.

Such a keypad is frequently positioned at the bottom of a recess of the data input electronic device. Such an arrangement is in fact advantageous in several respects. Firstly, it makes the input more confidential, since the recess limits the angles of view over the keypad thereby making it more difficult for a third party to see the potentially sensitive information that a user is in the process of inputting on the keypad. Secondly, it offers increased physical protection of the keypad, especially against the weather or against possible acts of vandalism. The keypad thus positioned at the bottom of the recess is for example much more difficult to reach with a projectile than a keypad which is flush with the front face of the data input device.

However, this arrangement of the keypad at the bottom of a recess does not only have advantages. In particular, the recess may be used by a malicious person to install, on top of the original keypad, for example by gluing, a spy device designed to collect potentially confidential data of a user of the data input device. Such a spy device is typically a false keypad. Thus installed in the recess, and if the appearance of the false keypad is similar to that of a legitimate keypad, it may be difficult for an unsuspecting user to detect the presence of this overlaid false keypad, since its thickness is at least partially hidden by the walls (or edges) of the recess. Storage or communication means are generally also hidden within the false keypad, allowing the malicious person to read the data input by the user, and in particular sensitive data such as, for example, the confidential code (or PIN code) of a bank card of the user.

To fight against this type of fraud, solutions have been developed to simplify the detection of a spy device, in particular of a false keypad, on the real keypad of the data input device. These solutions include in particular:

adding an external backlighting module above the keys of the keypad of the data input device: thus, if a false keypad is glued on top of the original keypad, the false keypad modifies and in particular limits the lighting over the top of the keypad, which can easily be detected by simply observing the device;

adding bosses (i.e. projections) creating relief on the keypad of the data input device: thus, it is more difficult to glue a false keypad on the original keypad due to the presence of these projections; in addition, if a false keypad is glued on top of the original keypad, this false keypad hides these bosses, which can easily be detected by simply observing the device;

forming cutouts in at least one edge of the recess in which the keypad of the data input device is positioned: thus, if a false keypad is glued on top of the original keypad, the false keypad is flush with or projects past the cutouts formed in the edges on the recess, which can easily be detected by simply observing the device.

As described previously, all these solutions are nevertheless based on a visual inspection of the keypad (for example by a person in charge of the maintenance and occasional monitoring of the data input device). In other words, the false keypad is not detected automatically, and it may take a certain amount of time (sometimes several hours, or even several days) before the next visual inspection, during which possible fraud attempts may continue.

There is therefore a need for a solution to detect a spy device which does not present these disadvantages of the existing solutions, and which can be used in particular to transfer an alert more rapidly and automatically in case of the presumed presence of such a spy device overlaid on a keypad of the data input device.

SUMMARY OF THE INVENTION

This technique relates to a solution aimed at overcoming some of the disadvantages of the prior art. This technique relates in fact to a data input device comprising a keypad positioned at the bottom of a recess of said data input device, this device further comprising:

at least one proximity sensor positioned within a housing formed in an element of said device forming a projection in the vicinity of said keypad, said element corresponding to a wall of said recess, said proximity sensor being oriented toward said keypad, said proximity sensor delivering measurements;

means for analysing said measurements, delivering information representative of the presumed presence of a spy device on said keypad when said measurements are higher than a predetermined threshold for a predetermined time period.

The data input device can therefore detect automatically—i.e. without the need for a visual inspection by an operator in the field—the presence of a spy device, typically a false keypad, overlaid on the legitimate keypad of the data input device, or at least automatically transfer information representative of the presumed presence of such a spy device.

In a particular embodiment, said at least one proximity sensor is positioned within a housing formed in an upper wall of said recess.

In a particular embodiment, said at least one proximity sensor is an infrared proximity sensor.

In a particular embodiment, said data input device comprises means for displaying an alert message on a screen of said data input device, that are activated when said information representative of the presumed presence of a spy device is delivered.

In a particular embodiment, said data input device comprises means for communicating an alert to a remote device, that are activated when said information representative of the presumed presence of a spy device is delivered.

In a particular embodiment, said data input device comprises means for blocking at least a part of said data input device, that are activated when said information representative of the presumed presence of a spy device is delivered.

According to a particular characteristic of this embodiment, said blocking means comprise means for switching off a screen of said data input device and/or means for blanking a card insertion slot of at least one transaction card reader of said data input device.

According to another aspect, the proposed technique also relates to a method for detecting a spy device positioned on a keypad of a data input device, said method comprising the following steps:

obtaining measurements delivered by at least one proximity sensor positioned within a housing formed in an element of said data input device forming a projection in the vicinity of said keypad, and oriented toward said keypad;

analysing said measurements;

delivering information representative of the presumed presence of a spy device on said keypad when said measurements are higher than a predetermined threshold for a predetermined time period.

According to another aspect, the proposed technique also relates to a computer program product downloadable from a communication network and/or stored on a computer-readable medium and/or executable by a microprocessor, comprising program code instructions to execute a method for detecting a spy device as described previously, when it is executed on a computer.

The proposed technique also relates to a computer-readable storage medium storing a computer program comprising program code instructions to execute the steps of the method as described previously, in any one of its embodiments.

Such a storage medium can be any entity or device capable of storing the program. For example, the medium can comprise a storage means, such as a ROM, for example a CD ROM or a microelectronic circuit ROM, or a magnetic recording means, for example a USB flash drive or a hard disk.

In addition, such a recording medium can be a transmissible medium such as an electrical or optical signal, that can be routed via an electrical or optical cable, by radio or by other means, such that the computer program it contains can be executed remotely. The program according to the invention can be downloaded in particular on a network, for example the Internet.

The various above-mentioned embodiments can be combined together to implement the invention.

FIGURES

Other characteristics and advantages of the invention will appear more clearly on reading the description which follows of a preferred embodiment, given as a simple illustrative and non-limiting example, and referring to the attached drawings, in which.

Figure 3:
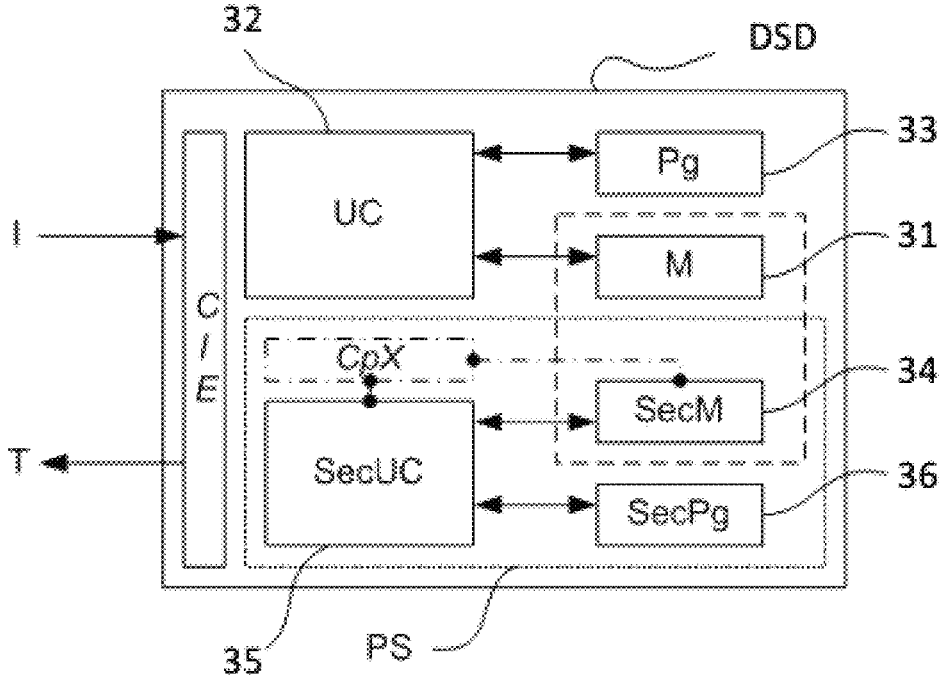

FIG. 3 describes a simplified architecture of a data input device for the implementation of the proposed technique, in a particular embodiment.

DETAILED DESCRIPTION OF THE INVENTION

Figure 1:
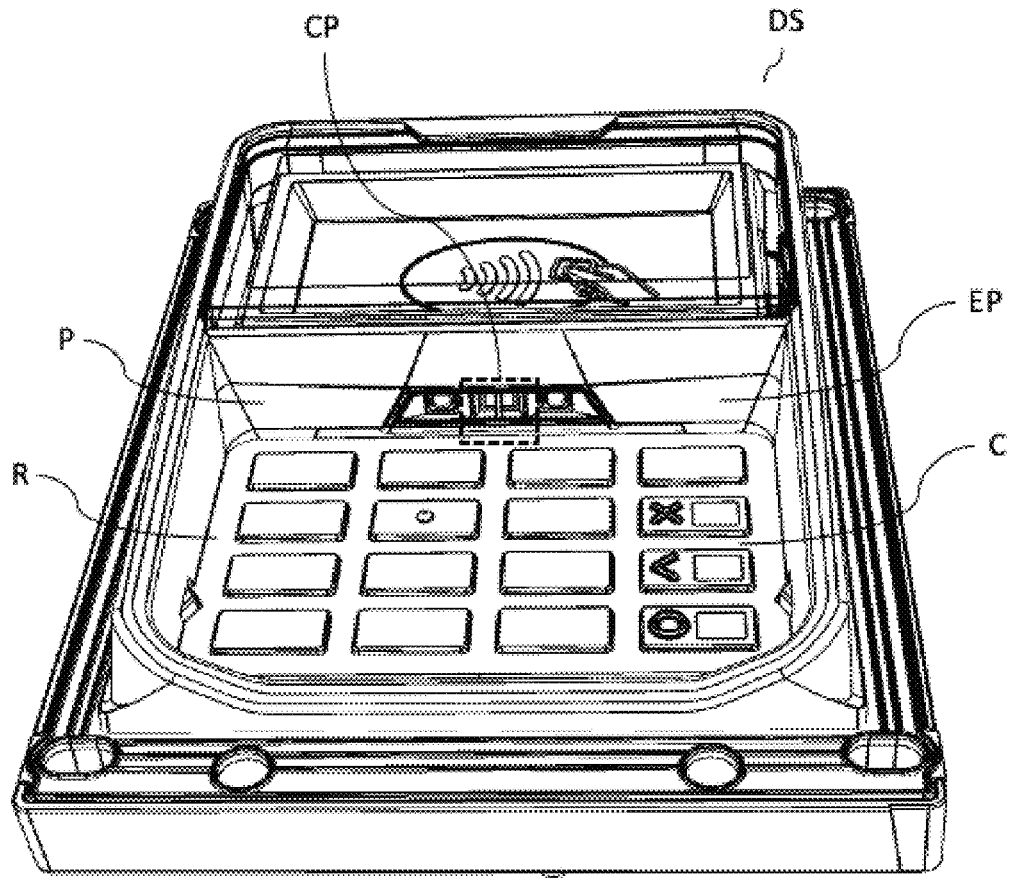
FIG. 1 shows an example of a data input device according to the proposed technique, in a particular embodiment.

This technique relates to a data input device, as shown for example referring to FIG. 1, in a particular embodiment. The data input device DS comprises a keypad C, sometimes referred to in the remainder of the document as "legitimate" keypad or "real" keypad, since the keypad C is the authentic keypad of the data input device DS. According to the general principle of the proposed technique, the data input device DS further comprises means for automatically detecting the presence of a spy device, typically a false keypad (or "pirate" keypad), overlaid on the legitimate keypad of the device, or at least transferring information representative of the presumed presence of such a spy device. "Automatically detecting" means in this case that there is no need, according to the proposed technique, to perform a visual inspection of the data input device in order to detect the presence of a spy device, unlike the solutions of the prior art.

These objectives are reached by combining, within the data input device DS, a proximity sensor CP (or, possibly, a plurality of proximity sensors), positioned and oriented in a special way, and means for analysing measurements delivered by this sensor.

According to the proposed technique, the proximity sensor CP is more particularly positioned within a housing formed in an element (EP) of the data input device DS forming a projection in the vicinity of the keypad. "Element forming a projection in the vicinity of the keypad" means an element positioned in a peripheral area near the keypad (for example at least a few centimetres from an edge of the keypad, for example less than two or three centimetres), and extending substantially perpendicularly to the main surface of the keypad (i.e. the surface with the keys of the keypad). Thus, the sensor is physically protected within its housing. In addition, the proximity sensor is oriented so that its detection area is directed towards the keypad C. More particularly, the proximity sensor is positioned, oriented and selected so that the detection area of this sensor includes or coincides with all or a major part of a volume located immediately above the keypad, whose basic surface is the keypad surface. Thus, the proximity sensor can detect the presence of a false keypad glued on the legitimate keypad, even if this false keypad is very thin (about one millimetre). In a particular embodiment, corresponding to that shown referring to FIG. 1, the keypad C is positioned at the bottom of a recess R of the data input device, and the projecting element EP (inside which the proximity sensor CP is installed) corresponds to a wall P of the recess R. "Recess" means in this case for example a cavity formed within the data input device, or an area of the device included between the walls of a keypad cover forming a projection on a surface of the device. Whether it consists of a cavity or the inside of a keypad cover, the recess is delimited by at least one wall substantially perpendicular to the bottom of the recess. In the conventional case of a rectangular keypad, the recess is generally delimited by four walls: an upper wall at the top of the keypad, a lower wall at the bottom of the keypad, and two side walls respectively on the left and right of the keypad. In such an embodiment, the proximity sensor is for example positioned, oriented and selected so that the detection area of this sensor includes or coincides with all or a major part of the volume located immediately above the keypad, whose basic surface is the recess surface, and the height is less than or equal to the height of the recess. Thus, the proximity sensor can detect any intrusion of an object into the volume defined by the recess. According to a particular characteristic of this embodiment, several proximity sensors are positioned in the walls of the recess, in order to limit or eliminate the presence of any "blind spots"-in other words areas potentially not covered by at least one proximity sensor-within the recess.

In a particular embodiment, corresponding to that shown referring to FIG. 1, the proximity sensor is positioned within a housing formed in an upper wall of the recess. Such a characteristic is advantageous, since the data input devices according to this technique are generally intended to be used by a person standing up (or possibly by a driver installed in their vehicle, through the open window of the vehicle), the data input keypad therefore being generally positioned in a vertical or substantially vertical plane, which is more adapted for this type of use than a "flat" position (i.e. in a horizontal or substantially horizontal plane). Since the proximity sensor is positioned in the upper wall of the recess, not only its physical protection is increased (this side of the recess is for example that which is the least likely to be reached by a projectile, when the keypad is positioned vertically and substantially at mid-height of a person), but also it is less visible than if it was positioned on another wall of the recess. Being thus better hidden, there is less likelihood of the proximity sensor being attacked by malicious persons who would for example try to deactivate it in order to install a false keypad on the legitimate keypad.

In this technique, various types of proximity sensor can be used to detect a spy device, such as for example capacitive, magnetic, ultrasonic, photoelectric proximity sensors, etc. However, in a particular embodiment, the proximity sensor is an infrared technology sensor, which offers numerous advantages since it is inexpensive, robust, capable of detecting all types of object (metallic or not) by day and by night, and has a range adapted to the conventional dimensions of a keypad equipping the data input devices more particularly concerned by the technique proposed, such as the kiosks containing payment terminals for example (i.e. the dimensions of such a keypad are typically about a few centimetres wide and long).

The proximity sensor delivers repeatedly (for example every second) at least one measurement, generally representative of an energy difference between a signal transmitted by a transmitter of the proximity sensor (for example the infrared light transmitted by an infrared LED of the sensor) and a signal received by a receiver of the proximity sensor (for example the infrared light received by an infrared receiver). These measurements are supplied as input to the analysis means of the data input device, which typically consist of one or more processors associated with one or more memories.

The analysis means determine whether, during a predetermined time period corresponding for example to a duration greater than the mean duration of use of the data input device by a user, the measurements obtained from the proximity sensor differ significantly (instantaneous values or sliding mean values) from the measurements obtained when the data input device is in an idle state, corresponding to a state in which:

the data input device is not used;

no spy device is installed on the keypad of the data input device.

In the affirmative, information representative of the presumed presence of a spy device on the keypad is delivered at the output of the analysis means, since this significant variation of the measurements obtained by the proximity sensor could be due to a structural modification in the vicinity of the keypad of the data input device (for example a structural modification within a recess in which the keypad is positioned).

More particularly, the measurements delivered by the proximity sensor are compared (instantaneous or mean values) with a predefined threshold stored within the data input device. The value of this threshold is determined according to several factors, including in particular the type of proximity sensor used and the structure of the data input device (in particular the geometry and dimensions of the recess when the keypad is positioned at the bottom of a recess). It is for example determined in the factory or the laboratory before installing the data input device in its final position, by comparing the measurements delivered by the proximity sensor when the data input device is in an idle state as defined previously with measurements delivered by the proximity sensor when the data input device is in an "altered" state, with an object positioned on the keypad having a shape similar to that of a spy device such as a false keypad. According to a particular characteristic, the data input device comprises means for updating this threshold, in order to adjust the detection sensitivity, even after the data input device has been installed, if this should prove necessary.

In a particular embodiment, the information representative of the presumed presence of a spy device on the keypad is delivered when the measurements obtained from the proximity sensor remain higher than a predetermined threshold for a predetermined time period.

If the information representative of the presumed presence of a spy device on the keypad of the data input device is delivered, various mechanisms are implemented, in various particular alternative or complementary embodiments described below, to protect users of the data input device against a risk of fraud and/or to alert an operator in charge of managing (e.g. administration, maintenance, etc.) the data input device.

In a particular embodiment, the data input device comprises means for example means for communicating an alert to a remote device, that are activated when information representative of the presumed presence of a spy device is delivered. These means consist for example of a network interface (wire or wireless, e.g. Wi-Fi, Bluetooth, cellular, etc.) used to transmit to a remote server and/or to a communication device (smartphone, tablet) of a field technician an alert message comprising an identifier of the data input device. The operator in charge of managing the data input device can therefore react quickly to inspect the device and, where necessary, take suitable measures to disable the spy device, thereby limiting the extent of the fraud.

In addition, the data input device comprises for example means for displaying an alert message on a screen of the data input device, that are activated when said information representative of the presumed presence of a spy device is delivered. Thus, a message dissuading the user from inserting their payment card into the reader and/or from using the keypad to input data can be displayed on the screen of the data input device, thereby reducing the risks of the fraud succeeding.

In another alternative or complementary particular embodiment, the data input device comprises for example means for blocking at least a part of the data input device, that are activated when the information representative of the presumed presence of a spy device is delivered. For example, these means may consist of means for switching off the screen of the data input device and/or blanking means (e.g. a protection flap) for blanking a payment card insertion slot of a reader of the data input device, to prevent a user from being able to use the data input device in this situation where a risk of fraud has been identified.

Figure 2:
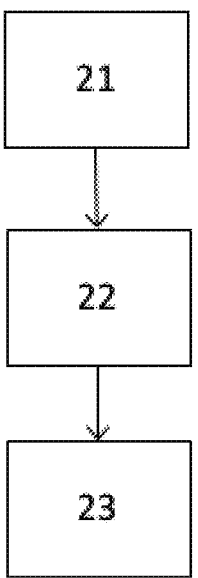
FIG. 2 shows the main steps of a method for remotely taking control of a payment terminal in a particular embodiment of the proposed technique.

According to another aspect, the proposed technique also relates to a method for detecting a spy device positioned on a keypad of a data input device. The main steps of such a method are shown referring to FIG. 2, in a particular embodiment. This method is for example implemented by a dedicated software module executed within the data input device, for example by a secure processor of the data input device, and it comprises:

in a step 21, obtaining measurements delivered by at least one proximity sensor positioned within a housing formed in an element of the data input device forming a projection in the vicinity of the keypad;

in a step 22, analysing said measurements, including comparing these measurements (instantaneous or mean values) with a predetermined threshold;

in a step 23, delivering information representative of the presumed presence of a spy device on said keypad when said measurements are higher than the predetermined threshold for a predetermined time period.

As already described previously referring to the description of the data input device, various complementary steps (not shown on FIG. 2) may also be implemented when information representative of the presumed presence of a spy device on the keypad is delivered at the end of step 23. These steps comprise for example:

transmitting an alert message to at least one remote device, via a communication network;

displaying an alert message on a screen of the data input device; and/or activating means for blocking at least a part of the data input device.

We will now describe, referring to FIG. 3, a simplified architecture of a data input device DSD capable of implementing the method for detecting a spy device as described previously, in a particular embodiment. Such a data input device DSD comprises a memory 31, a processing unit 32 equipped for example with a microprocessor, and controlled by a computer program 33. The data input device also comprises a secure memory 34, which can be merged with the memory 31 (as shown in dotted lines, in this case the memory 31 is a secure memory), a secure processing unit 35 equipped for example with a secure microprocessor and with physical protection measures (physical protection around the chip, by lattice, vias, etc. and protection on the data transmission interfaces), and controlled by a computer program 36 specifically dedicated to this secure processing unit 35, this computer program 36 implementing all or part of the detection method as described previously. The data input device DSD also comprises one or more proximity sensors connected to the processing unit 32 and/or the secure processing unit 35, it being possible to store the measurements taken by these sensors at least temporarily in the memory 31 and/or in the secure memory 35. The group composed of the secure processing unit 35, the secure memory 34 and the dedicated computer program 36 forms the secure portion (PS) of the data input device DSD. In at least one embodiment, this technique is implemented as a set of programs installed partly or totally on this secure portion of the data input device. In at least one other embodiment, this technique is implemented as a dedicated component (CpX) capable of processing data of the processing units and installed partly or totally on the secure portion of the data input device DSD. In addition, the data input device DSD also comprises communication means (CIE) consisting for example of wireless (Wi-Fi, 3G/4G/5G, etc.) or wire (Ethernet, USB, etc.) network components allowing the device to receive data (I) from entities connected to one or more communication networks and to transmit processed data (T) to such entities.

The invention claimed is:

1. A data input device, comprising:

a recess in the data input device defined by a bottom and a plurality of walls extending up from the bottom;

a keypad positioned at the bottom of the recess of said data input device;

a housing formed in one of the plurality of walls of the recess, at least one proximity sensor positioned within the housing and oriented in a direction toward said keypad with a detection area including a volume of the recess immediately above the keypad, said proximity sensor delivering measurements; and a processor for analyzing said measurements, delivering information representative of a presumed presence of a spy device positioned on said keypad when said measurements are higher than a predetermined threshold for a predetermined time period.

2. The data input device according to claim 1, wherein said at least one proximity sensor is positioned within a housing formed in an upper wall of said recess.

3. The data input device according to claim 1, wherein said at least one proximity sensor is an infrared proximity sensor.

4. The data input device according to claim 1, wherein said information representative of the presumed presence of the spy device is delivered as an alert message displayed on a screen of said data input device.

5. The data input device according to claim 1, further comprising a network interface for communicating an alert to a remote device, that are activated when said information representative of the presumed presence of the spy device is delivered.

6. The data input device according to claim 1, further comprising a computer program executing on the processor, for blocking at least a part of said data input device, that is activated when said information representative of the presumed presence of the spy device is delivered.

7. The data input device according to claim 6, wherein the computer program executing on the processor for blocking switches off a screen of said data input device.

8. The data input device according to claim 1, further comprising a protection flap for blanking a card insertion slot of the at least one transaction card reader of said data input device, wherein the protection flap is activated when said information representative of the presumed presence of the spy device is delivered.

9. A method for detecting a spy device positioned on a keypad at a bottom of a recess of a data input device, the recess being defined by the bottom and a plurality of walls extending up from the bottom, the method comprising steps of:

transmitting a signal by a transmitter of a proximity sensor toward the keypad, the proximity sensor positioned in one of the plurality of walls of the recess and oriented in a direction toward said keypad with a detection area including a volume of the recess immediately above the keypad;

receiving a signal by a receiver of the proximity sensor;

obtaining repeated measurements, over a predetermined time period, representative of an energy difference between the signal transmitted by the transmitter and the signal received by the receiver;

executing a computer program on a microprocessor in the data input device to analyze said measurements to compare the measurements with a predetermined threshold; and delivering information representative of a presumed presence of the spy device on said keypad when said measurements are higher than the predetermined threshold for the predetermined time period.

10. A computer program product stored on a non-transitory computer-readable medium and executable by the microprocessor, comprising the computer program including program code instructions to execute the method according to claim 9, when the computer program is executed by the microprocessor.

\*　　\*　　\*　　\*　　\*